United States Patent [19]

Pierce

[11] Patent Number: 4,578,533

[45] Date of Patent: Mar. 25, 1986

[54] SWITCHABLE LINE POWERED MODEM

[75] Inventor: O. Leon Pierce, Huntsville, Ala.

[73] Assignee: Universal Data Systems, Inc., Huntsville, Ala.

[21] Appl. No.: 580,279

[22] Filed: Feb. 17, 1984

Related U.S. Application Data

[63] Continuation of Ser. No. 203,111, Nov. 3, 1980, abandoned.

[51] Int. Cl.$^4$ .......................................... H04M 11/00
[52] U.S. Cl. .................................. 179/2 DP; 370/30; 375/8
[58] Field of Search .............. 179/2 C, 2 DP, 84 VF; 307/521-524, 475; 250/211 J; 363/134; 328/149; 370/30, 32; 375/8; 455/214, 343; 330/305, 306

[56] References Cited

U.S. PATENT DOCUMENTS

| | | | |
|---|---|---|---|
| 2,571,031 | 10/1951 | Hansell ................................. | 455/343 |
| 3,426,151 | 2/1969 | Tygart ............................. | 455/214 X |
| 3,539,727 | 11/1970 | Pasternack ............................. | 179/2 |
| 3,577,201 | 5/1971 | Quatse et al. ..................... | 179/2 DP |
| 3,760,289 | 9/1973 | Hurtig, III . | |
| 3,793,486 | 2/1974 | Koziol ................................. | 375/8 X |
| 3,803,429 | 4/1974 | Wieczorek et al. ............ | 328/149 X |
| 3,806,824 | 4/1974 | Storzbach . | |
| 3,852,531 | 12/1974 | Fretwell et al. .................. | 179/2 DP |
| 3,940,709 | 2/1976 | Heaslett . | |
| 4,009,400 | 2/1977 | Harris et al. ......................... | 307/521 |
| 4,233,658 | 11/1980 | Lupatin et al. .................. | 363/134 X |
| 4,340,922 | 7/1982 | Delaporte et al. ..................... | 361/91 |
| 4,373,117 | 2/1983 | Pierce ............................. | 179/2 DP |
| 4,395,590 | 7/1983 | Pierce et al. ...................... | 179/2 DP |
| 4,417,099 | 11/1983 | Pierce ............................. | 179/2 DP |
| 4,436,956 | 3/1984 | Schreiber ............................ | 179/2 C |
| 4,440,987 | 4/1984 | Heep et al. ....................... | 179/2 DP |

FOREIGN PATENT DOCUMENTS 61316  9/1982  European Pat. Off. ................ 375/8

OTHER PUBLICATIONS

R. M. Swanson et al., "Ion-Implanted Complementary MOS Transistors in Low-Voltage Circuits," 1972, IEEE International Solid-State Circuits Conference, pp. 192-193.

Charles J. Sippl, *Data Communications Dictionary*, Van Nostrand Reinhold Company, 1976, p. 22.
Rudolf F. Graf, *Modern Dictionary of Electronics*, Howard W. Sams & Co., Inc., 1977, pp. 64-65.
Roubik Gregorian et al., "CMOS Switched-Capacitor Filter for a Two-Chip PCM Voice Coder," 1979, IEEE International Solid-State Circuits Conference, pp. 28-29.
Harold S. Stone, *Microcomputer Interfacing*, Addison-Wesley Publishing Company, 1982, pp. 167-171, 188-189.
Dogan A. Tugal et al., *Data Transmission*, McGraw-Hill Book Company, 1982, pp. 94-95, 178-179.
Martin H. Weik, *Communications Standard Dictionary*, Van Nostrand Reinhold Company, 1983, p. 70.
Altman, Laurence, "Special Report: Optoelectronics Makes it at Last . . . ", Electronics, Nov. 8, 1971, p. 63.
Bell Systems Practices, Issue 2, Apr., 1972, pp. 2-56.
Delaporte, F., and Pantani, J. P., "Logic Interface Module," IBM TDB, vol. 21, No. 11, Apr., 1979, pp. 4559-4560.
Severns, Rudy, "Switchmode Converter Topologies--Make Them Work For You!," Intersil Application Bulletin A035, 1980, p. 11.
Krutz, Ronald L., *Microprocessors and Logic Design*, (John Wiley & Sons, N.Y.), 1980, p. 404.
Pasahow, Edward J., *Microcomputer Interfacing for Electronics Technicians* (McGraw-Hill Book Co., N.Y.), 1981, pp. 122-123.
W. C. Mills, "A New Approach to Modem Design," *Commun. & Broadcast*, (GB), vol. 4, No. 2, Spring 1978, pp. 32-39.

*Primary Examiner*—Keith E. George
*Attorney, Agent, or Firm*—Weingarten, Schurgin Gagnebin & Hayes

[57] ABSTRACT

A modem for coupling a data terminal or other apparatus to a telephone line and deriving its operating power for both transmitting and receiving operation from the telephone line, and providing electrical isolation between the telephone line and the data terminal. The modem is switchable to provide orginate or answer operation in either of two operating frequency bands.

18 Claims, 6 Drawing Figures

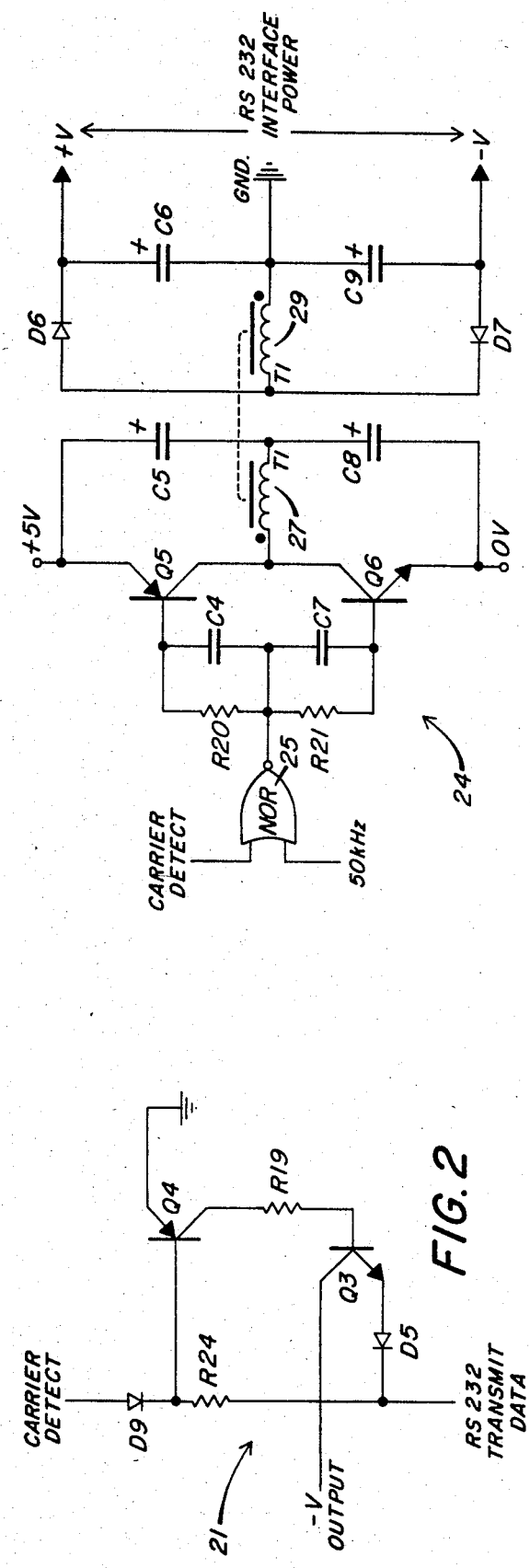

SWITCHABLE LINE POWERED MODEM

This application is a continuation of application Ser. No. 203,111, filed Nov. 3, 1980, now abandoned.

FIELD OF THE INVENTION

This invention relates to data modems for coupling data to and from a telephone line, and more particularly to a modem which derives its operating power from the telephone line.

BACKGROUND OF THE INVENTION

For data transmission on a standard voice grade telephone line a modem is employed which is operative to modulate data in a form suitable for transmission along the telephone line, and to demodulate data received from the telephone line to reproduce the data transmitted from a remote site. The modem requires a power supply for energizing its electronic circuits and this power supply is usually operative from an AC power outlet or a battery source.

In many instances an AC power source is not conveniently available, and, in the case of a battery source, the modem may be at a location where battery monitoring or replacement is inconvenient. In addition, the power supply adds to the expense and size of a modem. It would be advantageous to provide power for operation of the modem circuits from the telephone line itself to thereby dispense with the need for any separate modem power supply or access to a separate power source.

A modem is disclosed in copending application of O. Leon Pierce, Mark C. Smith, and R. Byron Driver, entitled Line Powered Modem, Ser. No. 203,108 filed Nov. 3, 1980 now U.S. Pat. No. 4,395,590 and assigned to the same assignee as this invention, in which the entire operating power for the modem circuits is derived from the available telephone line power.

SUMMARY OF THE INVENTION

In accordance with the present invention, a modem is provided which derives its entire operating power from the available telephone line power in a manner similar to that described in the aforesaid copending application, and which is selectably operable in originate or answer modes for transmission or reception in either of two operating frequency bands. The modem includes an interface and power source for coupling signals from the telephone line to the modem for demodulation, and signals from the modem to the telephone line for transmission. The interface and power source provides regulated operating voltages for the entire modem and at a minimum current sufficient to hold the telephone line in an off hook condition. The power source provides a low DC resistance and a high AC impedance sufficient to substantially match the telephone line impedance. The modem exhibits very low power consumption and within the 160 milliwatts of available power from the telephone line. A switchable feedback band pass filter is provided for selection of the pass band for either of the two available bands. The band switching is accomplished with CMOS switches with extremely low power consumption. The switches alter the topology of the feedback network of the filter to produce the selected band-pass and band-reject characteristics in the selected answer or originate mode.

DESCRIPTION OF THE DRAWINGS

The invention will be more fully understood from the following detailed description taken in conjunction with the accompanying drawings, in which:

FIG. 2 is a schematic diagram of the power off inhibit circuit 21 of FIG. 1;

FIG. 3 is a schematic diagram of the DC to DC converter 24 of FIG. 1;

DETAILED DESCRIPTION OF THE INVENTION

Figure 1:
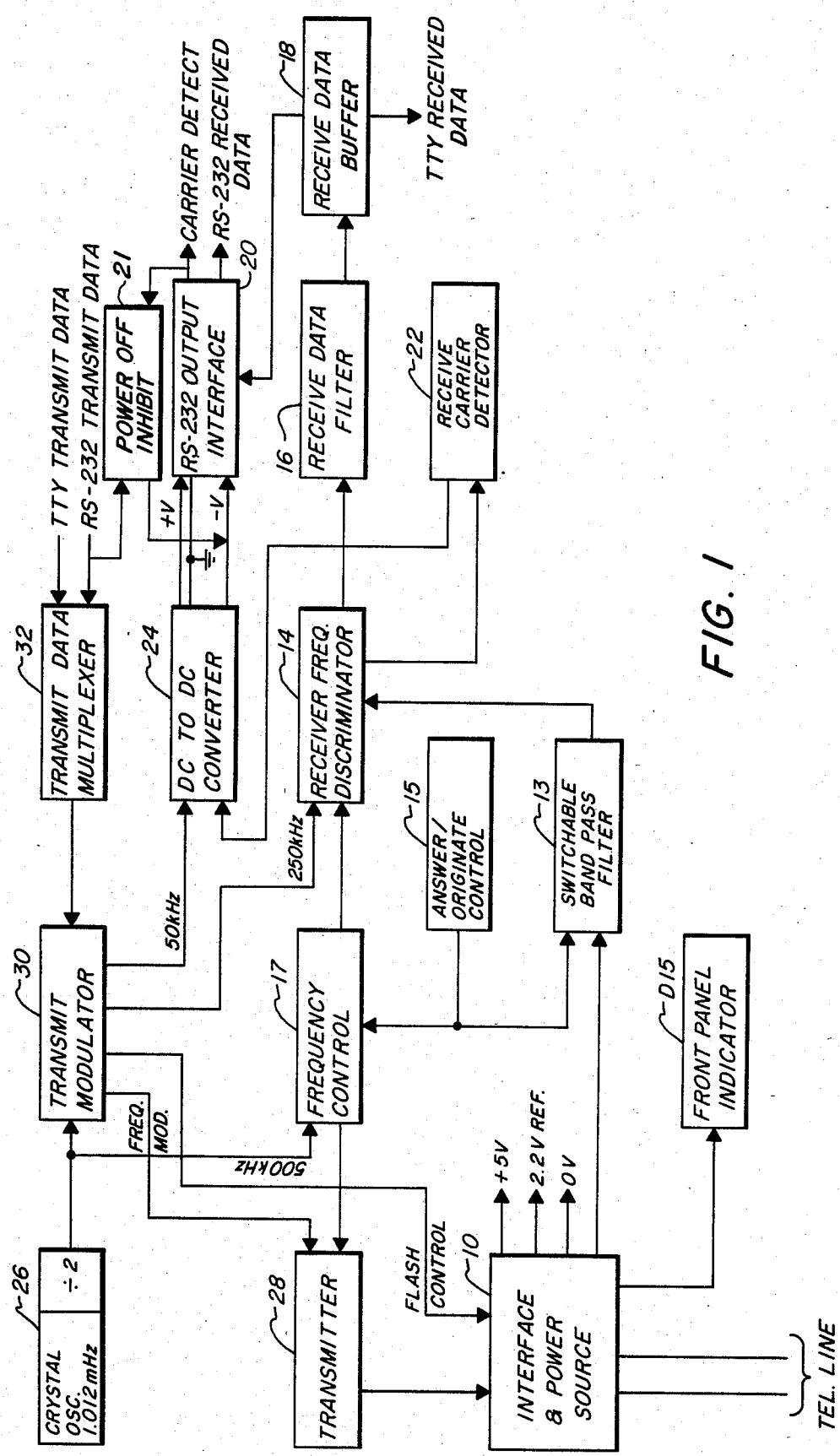
FIG. 1 is a block diagram of a preferred embodiment of a line-powered modem in accordance with the invention.

A line powered modem embodying the present invention is shown in FIG. 1. In the illustrated embodiment the modem is a type 103 originate or answer modem which provides full duplex operation at transmitting and receiving rates up to 300 bits per second (baud) and employing two level frequency shift keyed (FSK) modulation. Two carrier frequencies are employed, one at a center frequency of 1170 Hz and the other for reception at a center frequency of 2125 Hz, and either of which may be used for transmission or reception. To minimize power consumption, the modem is constructed of CMOS digital integrated circuits which have inherently low current requirements. The CMOS circuits are also relatively inexpensive, thereby permitting economical construction. The modem employs digital signal processing including digital synthesis of the transmitted frequencies and digital discrimination of the received frequencies to achieve highly accurate frequency stability at low power levels and in a compact and relatively inexpensive manner.

The modem is connected to a fully powered by the telephone line, and is also connected to a data terminal, business machine or other apparatus to and from which data is transferred. The modem provides electrical isolation between the telephone line and the utilization apparatus. The telephone line is connected to a telephone line interface and power source 10 which provides operating power derived from the telephone line to all modem circuits. This interface circuit 10 also couples signals from the telephone line for demodulation by the modem, and signals from the modem to the telephone line for transmission. In order to hold the telephone line in an off hook condition, a current in the range of 20–150 milliamperes must be drawn. The minimum load requirements for the telephone line are specified to be 8 volts drop at 20 milliamperes. As a result, the telephone line can provide a minimum of 160 milliwatts of power to circuitry connected thereto. An input impedance of 600 ohms must also be maintained to accord with telephone specifications. The modem described herein has a minimum power requirement of 8 volts at 17 milliamperes, or 136 milliwatts. This very low power consumption is well within the 160 milliwatts limit of available power from the telephone line.

The telephone line has a specified nominal DC level of 48 volts and a DC equivalent series resistance (minimum source resistance) of 400 ohms. The actual DC current on a particular line will depend on the resistance of that particular line, which is a function of the length of the line from the central office power source. Typically, the equivalent line resistance can be from near zero to about 1200 ohms. For the illustrated type 103 modem, the interface and power source 10 provides a regulated 5 volt output with respect to a common terminal and a regulated 2.2 volt output with respect to the common terminal which is employed as a reference voltage in the modem. The 2.2 volt reference is employed in the shunt regulator of the power source and as a voltage bias for the receiver operation. The circuit 10 is also operative to couple audio data signals received on the telephone line to the modem receiver, and to couple data signals from the modem transmitter to the telephone line for transmission to a remote receiver.

The interface and power source 10 can be considered as a shunt regulator across the load and a current regulator in series with the load. The shunt regulator functions much like a Zener diode and provides a voltage level which is substantially constant irrespective of variations in applied current. The current regulator provides a low DC resistance of about 10-20 ohms, and provides an AC impedance which is relatively high such that audio variations in line voltage cause no appreciable current change through the load. This current regulator serves as an active electronic circuit equivalent to the large inductor which would normally be required to separate the audio signals from the DC telephone line current.

Referring to FIG. 1, received signals from the telephone line are coupled by interface and power source 10 to a switchable band pass filter 13 which is operative to limit the received signal spectrum to the desired band which is usually specified to be approximately 350 Hz centered at a frequency of either 1170 Hz or 2125 Hz, as selected by a user. The filter 13 includes an amplifier to provide an amplified output signal which is applied to a receiver frequency discriminator 14. This frequency discriminator includes a digital phase lock loop and is operative to provide a digital signal having a duty cycle representing the frequency of the signal from filter 13. The variable duty cycle signal is applied to a receive data filter 16 which removes unwanted harmonics and averages the variable duty cycle input signal to produce an output which is a linearly varying voltage which is directly proportional to the frequency of the received signal.

An answer/originate control 15 is manually operable by a user and provides a control signal to the switchable filter 13 for selection of an answer or originate mode; that is, for selection of the operating band to be employed for reception. This control signal is also applied to a frequency control 17 which provides corresponding control signals to the receiver frequency discriminator 14 for selection of the intended reception band, and to the transmitter 28 for selection of the intended transmission band.

The signal from the data filter 16 is applied to a receive data buffer 18 which provides as an output TTY (teletypewriter) received data. The data buffer 18 also provides an output signal to an RS232 output interface 20 which provides as an output RS232 received data and a carrier detect signal. The receive data buffer 18 includes a slicer circuit operative to determine whether the voltage corresponds to a frequency above or below the center frequency of the receiver band. If the analog voltage denotes a frequency above the center frequency, the data buffer 18 provides a voltage output level at the mark state. If the voltage denotes a frequency below the center frequency, the data buffer 18 provides an output voltage level at the space state.

The received data is provided by way of electro-optical isolators which achieve complete electrical isolation between the modem and the associated utilization apparatus. The data buffer 18 includes two electro-optical isolators which are part of an output buffer. One isolator is employed to provide a current switched between two levels, depending upon the mark or space state of the received data, for TTY equipment. The other isolator is employed to provide an RS232 data output by way of interface 20. The output interface 20 also provides a carrier detect signal in the presence of a valid carrier being received. In the 103 modem two criteria are employed for determining the validity of a received carrier. If there is sufficient energy in the receiver band, the presence of that energy is assumed to be a carrier from the transmitting site. Normally the level of discrimination is of the order of −46 DBM. Thus, if the received signal energy exceeds −46 DBM, and the frequency of the received energy is within a band of about 400 Hz centered at 2150 Hz, it is recognized to be a valid carrier.

The frequency discriminator 14 includes a level detector operative to detect signals above a predetermined level, and also includes circuitry for sensing within a predetermined frequency band. For recognition of a valid carrier signal, the signal level must exceed the discriminator threshold level and be within the discriminator band. The discriminator 14 provides to the carrier detector 22 a signal of one binary level upon detection of a valid carrier, and of a second binary level if no carrier is present or does not meet the detection criteria. Thus, the carrier detector 22 receives a bilevel signal from the frequency discriminator 14 indicative of the presence or absence of a valid carrier, and provides an enable signal to DC to DC converter 24 in the presence of a valid carrier signal. The converter 24 is driven by an unbalanced 50 kHz square wave signal from transmit modulator 30. The 50 kHz unbalanced signal has a duty cycle of 60 percent positive and 40 percent negative cycles.

The DC to DC converter 24 is operative to convert the 5 volt power signal derived from the telephone line to the voltages used to drive the RS232 interface circuit 20 which provides the interface signals to be applied to the associated utilization apparatus. The converter furnishes the minimum power necessary to ensure that the interface signals are of sufficient signal level to be properly received by the business machine or other utilization apparatus. The voltages provided by the converter are offset in the positive direction, since most RS232 receivers have a positive threshold in the range of +0.5 to 1.0 volt. The interface circuit 20 provides the carrier detect output signal and the RS232 received data signal to be applied to the associated apparatus. The RS232 interface is specified to have a minimum voltage of +3 volts or −3 volts, depending on the state of the output, and a minimum load of 3 K ohms. This requires a minimum of about 1 milliampere of current.

The DC to DC converter 24 is shown in FIG. 3. The carrier detect signal from received carrier detector 22, and the 50 kHz square wave from transmit modulator 30 are applied via a NOR gate 25 to the base electrodes of respective transistors Q5 to Q6 via RC networks composed, respectively, of resistor R20 and capacitor C4, and resistor R21 and capacitor C7. The collectors of transistors Q5 and Q6 are connected to one end of a first transformer winding 27, the other end of which is connected via a capacitor C5 to the emitter of transistor Q5 and via a capacitor C8 to the emitter of transistor Q6. The secondary winding 29 of transformer T1 is connected to anode of a diode D6 and to the cathode of a diode D7. The cathode of diode D6 is connected via a capacitor C6 to the other end of winding 29 and which is also connected via a capacitor C9 to the anode of diode D7. The two winding transformer T1 provides electrical isolation between the telephone line and the utilization apparatus to which the modem is connected. The primary winding of the transformer is driven by a 5 volt peak-to-peak square wave at a frequency of 50 kHz having an unbalanced duty cycle of 60 percent positive and 40 percent negative cycles. The voltage at the junction of capacitors C5 and C8 will assume the average of the voltage excursions, which is about +3 volts. The transformer secondary has a voltage step-up ratio of about 2:1 and will provide an unbalanced voltage output of about +6 volts and about −4 volts which are rectified by diodes D6 and D7 to furnish about +5.5 volts and −3.5 volts to operate the RS232 interface 20.

To meet standard RS232 operating requirements, it is often required that the carrier detect and data signals be at a negative voltage to indicate a mark or off state even when no data is being sent or received. If the telephone line were not connected to the modem, the modem could not furnish any power to the interface circuit 20. In this instance, the RS232 transmit data is held in a mark state and a power off inhibit circuit 21 automatically applies this negative (mark) voltage to the negative supply voltage input of interface circuit 20, thereby to permit the interface circuit to provide the carrier detect and received data outputs in a mark or off state. The power off inhibit circuit 21 is shown in FIG. 2. When the modem is powered and the carrier detect signal is present, the transistors Q4 and Q3 are non-conductive and the circuit is disabled. When the modem is not powered or the carrier detect signal is not present, and therefore no power is applied to interface circuit 20, the mark or negative state of the RS232 transmit data signal causes transistors Q3 and Q4 to conduct and permits a negative output voltage to be provided to interface circuit 20. The mark level is specified to be in the range of −5 to −15 volts, and is usually in the range of −6 to -12 volts, and a corresponding negative voltage within these operating ranges is provided at the collector of transistor Q3. Thus, when the modem is not powered by the telephone line, the data terminal from the associated data apparatus provides the negative voltage to power the interface circuit 20 to permit it to provide the carrier detect and received data outputs in a mark state.

Master timing is provided by a crystal oscillator and frequency divider circuit 26. The crystal oscillator is operative at 1.012 mHz and, after division, provides a 506 kHz clock signal to frequency control 17 and to modulator 30. The crystal oscillator frequency of 1.012 mHz is selected to satisfy the frequency requirements of both operating bands with the digital logic employed. This crystal frequency also permits implementation of the oscillator with available CMOS circuits operable at a voltage level of 5 volts for the intended signal rates. The crytal oscillator frequency is divided by a factor of two to provide a 506 kHz clock signal which is sufficient for the maximum resolution required by the digital circuits.

The transmitter frequency of either 1170 Hz or 2125 Hz is digitally synthesized and provided by the transmitter 28. The FSK modulation is provided by transmit modulator 30. The TTY data or RS232 data to be transmitted is applied to a data multiplexer 32 which provides the data to modulator 30. The modulator is operative to frequency shift the transmitter carrier in a phase coherent manner to provide the FSK modulated signal which is applied via interface 10 to the telephone line for transmission to a compatible modem at the other end of the line. The modulator also provides a 50 kHz unbalanced square wave signal to drive the DC to DC converter. In addition, the modulator provides a 250 kHz clock signal to the receiver frequency discriminator 14, and flash control signal to interface and power source 10 to cause flashing of front panel indicator D15 when no valid carrier is present. The transmitter 28 includes a sinewave synthesizer, digital counters and digital-to-analog converter to generate an analog signal which after appropriate filtering is applied to the telephone line for transmission. The transmitted frequency is 1170 Hz or 2125 Hz±the frequency deviation caused by the mark or space states of the transmitted data.

Figure 4:
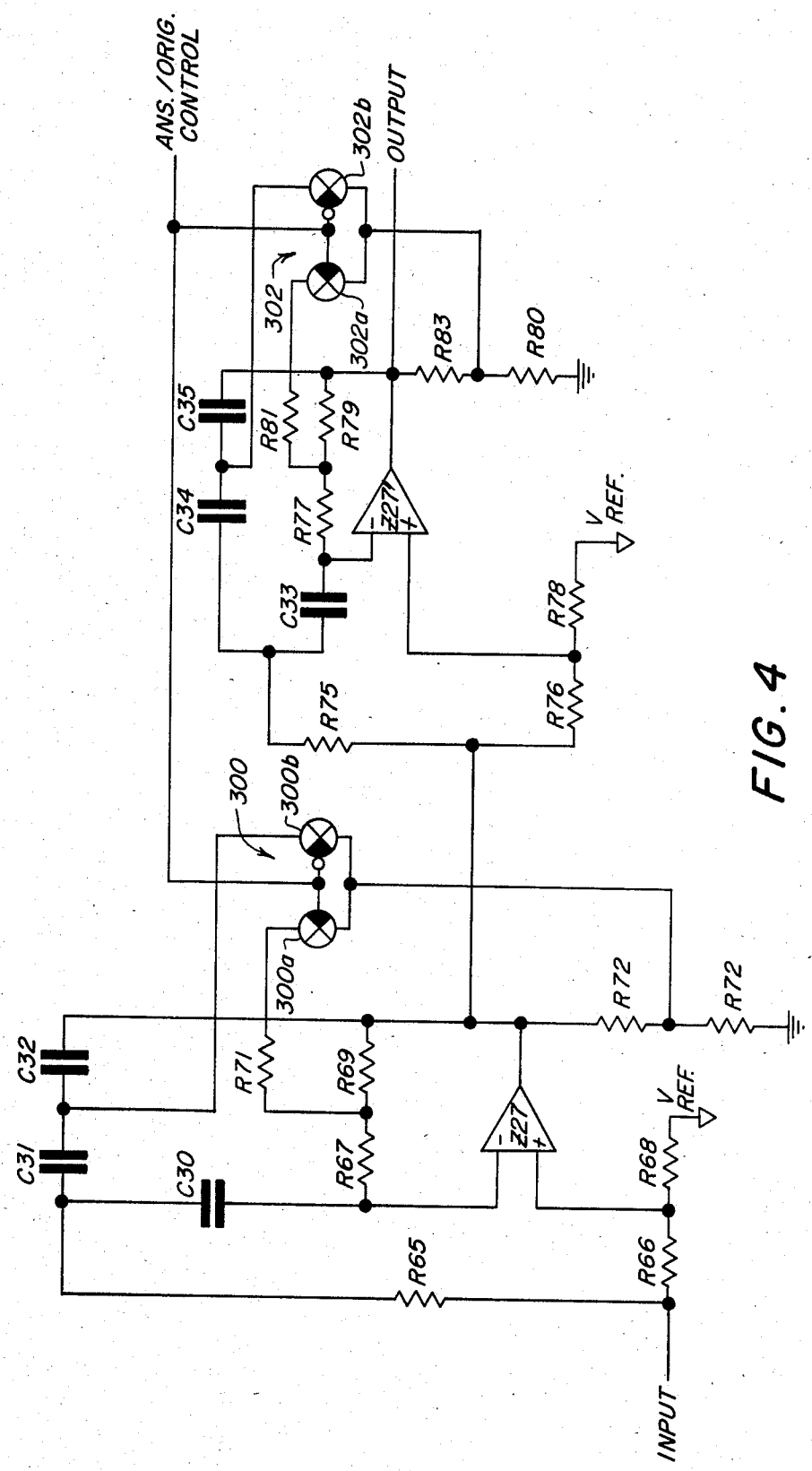
FIG. 4 is a schematic diagram of the switchable filter 13 of FIG. 1.

The switchable filter is shown schematically in FIG. 4 and is operative in response to an answer/originate control level to provide a predetermined band pass characteristic in either of two operating bands and a predetermined band rejection characteristic in the other of the selected bands. The filter functions to enhance the signals being received from a transmitting modem in the selected answer band, while rejecting the signals from the local transmission in the originate band. The 103 modem operates in a full duplex manner, and thus frequencies in both operating bands can be simultaneously present. The local transmitting signal is quite strong, typically about −10 Dbm, while the received signal is quite weak, typically as low as −50 Dbm. The band pass/band rejection characteristics of the filter are therefore very stringent. The present switchable filter provides the intended band pass and band rejection characteristics for both switched modes with relatively low operating current. CMOS switches are employed by reason of their low current requirements for switching between the two intended filter bands. At the low operating voltage of 5 volts derived from the telephone line, these CMOS switches have resistances within the range of several hundred ohms, the particular switch resistance being rather unpredictable with presently available devices. The filter implementation is configured such that the switch resistance has an insignificant effect in the intended filter characteristics.

As evident from FIG. 4, the filter is a two-stage stagger tuned active band pass/band reject filter having capacitive and resistive feed-back paths. The filter stages are similar, preferably with the frequencies staggered by about 200 Hz. Each filter stage includes a differential operational amplifier Z27 and Z27', respectively, and associated resistance and capacitor networks which are selectably employed in a manner determined by the states of CMOS switches 300 and 302. The capacitors C31 and C32 provide a capacitive feed-back path for amplifier Z27, while the resistors R67 and R69 provide a resistive feed-back path for this amplifier. The resistors R66 and R66 provide a feed forward path to the non-inverting input of amplifier Z27 to provide a band reject or notch filter characteristic.

The answer/originate control signal is typically a logic level of +5 volts for the answer mode and 0 volts for the originate mode. Each pair of CMOS switches is operative in complementary manner. Thus, switch 300a is conductive in response to the control level of +5 volts, while the switch 300b is conductive in response to the control level of 0 volts. The switches 302a and 302b are similarly operative. For one mode of operation, switch 300a is conductive and switch 300b is nonconductive such that the resistive feedback is reduced, resulting in a filter pole at about 1200 Hz and a filter notch at about 2200 Hz. The operation of the second filter stage with switch 302a conductive and switch 302b non-conductive is substantially the same as in the first stage. Preferably, the frequency response of the second stage is staggered in relation to that of the first stage to provide an intended composite filter response.

In the second mode of operation, the switch 300b is conductive and the switch 300a is non-conductive to cause increase of the capacitive feedback, resulting in a pole at about 2200 Hz and a notch at about 1200 Hz. The output voltage of amplifier Z27 is divided by means of resistive dividers R70 and R72 and depending on the state of switch 300, the output voltage is applied to capacitor C31 or resistor R67 to cause a high pass or a low pass characteristic and associated notch. Since the impedances of capacitor C31 and resistor R67 are high, the resistance of the CMOS switch 300 has little effect on the intended characteristics of the filter. The resistor R71 provides equalization of the overall filter gain when switching from one band to the other. The second filter stage operates in similar manner.

Figure 5:
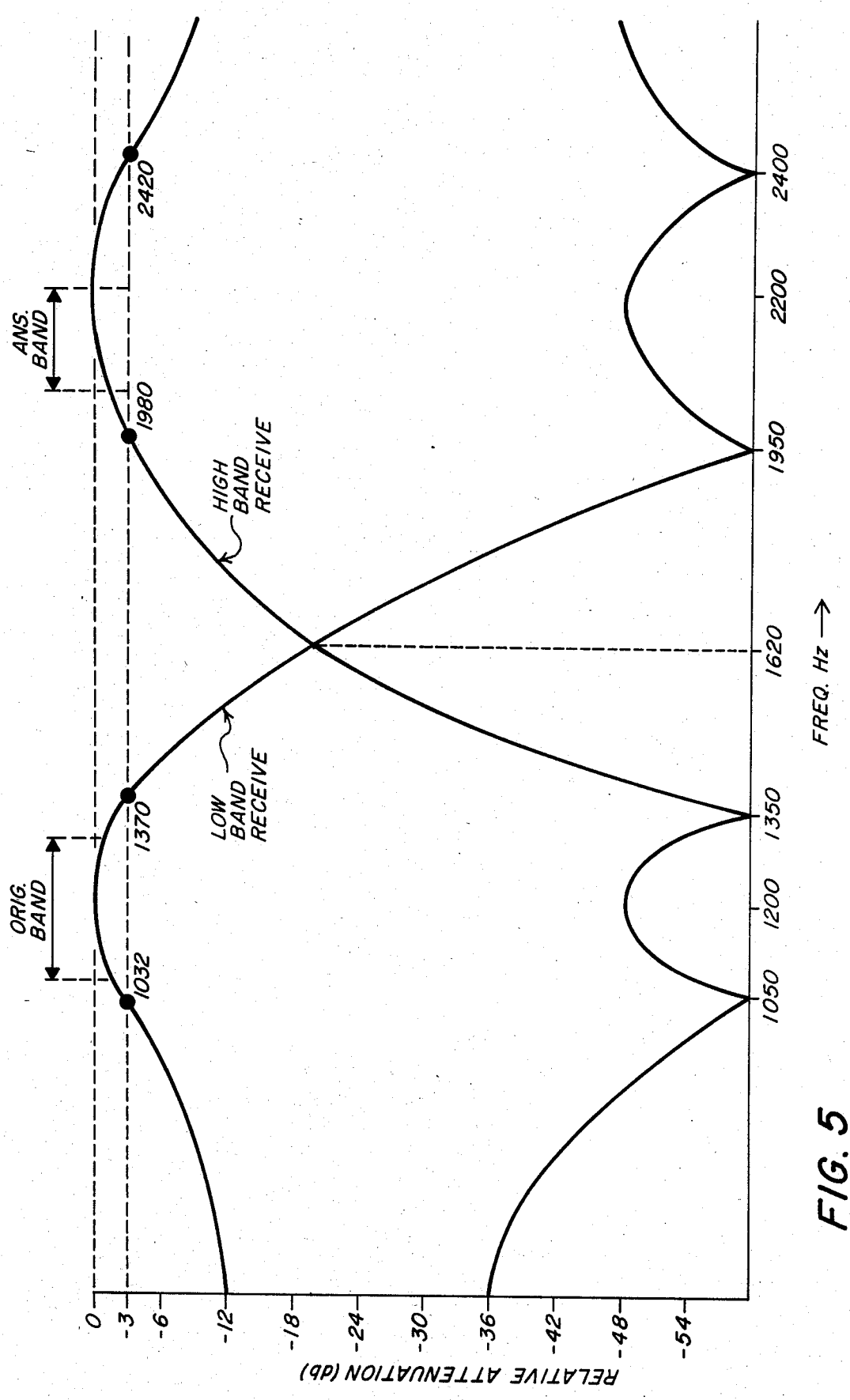
FIG. 5 is a plot of the filter response of the filter of FIG. 4.

The response of one stage of the filter of FIG. 4 is illustrated in FIG. 5. In one mode, the filter provides a pass band centered at about 1200 Hz and a rejection band centered at about 2200 Hz, as is employed for the lower (originate) frequency receive band. For the second operating mode in which the receive band is at the higher (answer) frequency, the filter provides a pass band centered at about 2200 Hz and a rejection band centered at about 1200 Hz.

Figure 6:
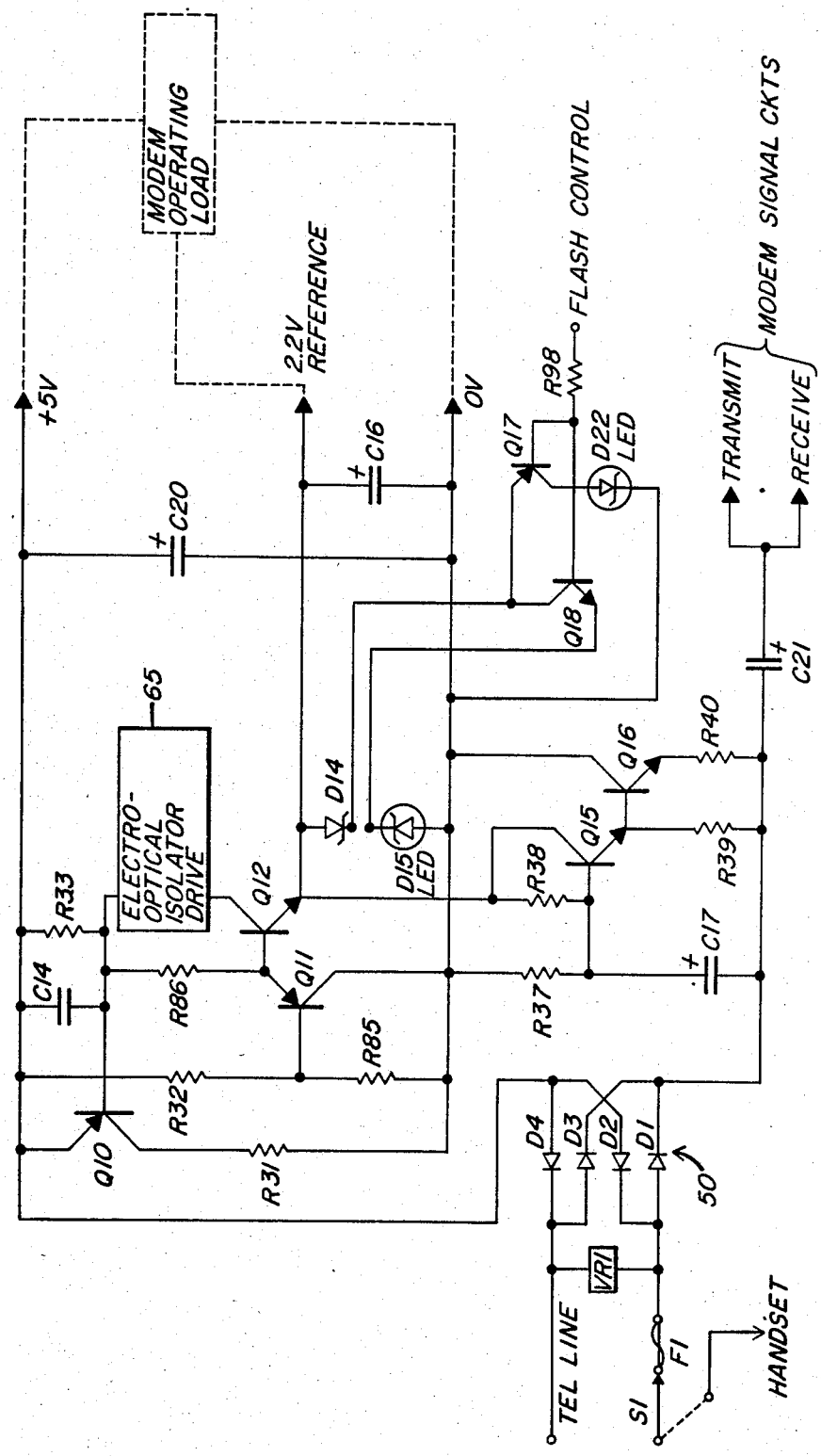
FIG. 6 is a schematic diagram of the interface and power source 10 of FIG. 1.

The interface and power source 10 is shown in FIG. 6 and includes an input circuit having a switch S1 which selects routing of the telephone line between the modem and the telephone handset which is employed to complete a call. A fuse F1 protects the modem from high currents that can be caused by lightning strikes or transients on the telephone line, and a varistor VR1 serves to limit the voltage across the modem input to prevent application of any breakdown voltages to the modem. Typically, the voltage is limited to be less than 22-30 volts. The telephone line is connected via switch S1 and the protective elements to a bridge 50 composed of diodes D1 through D4 and which functions as a polarity guard to permit the modem to receive correctly polarized DC current from the telephone line even though the line may be reversed from its usual polarity.

The transistors Q10, Q11, and Q12 and the associated components function as a shunt regulator to maintain a constant voltage across the modem circuits, which are the load, and to shunt any excess current above that required by the load. The transistors Q15 and Q16 and associated components function as a constant current source to block AC current and pass DC current. The audio data signals are AC coupled to or from the telephone line by means of a capacitor C21. The received signals are applied to the receive filter 12 (FIG. 1), and the transmit signals are provided by the transmitter 28 (FIG. 1). The circuit of FIG. 4 also limits the voltage drop on the telephone line to ensure a minimum of 20 milliamperes of DC line current. An electro-optical isolator drive circuit 65 is driven by the collector current of transistor Q12 and is operative to drive the LEDs of the two isolators which are within receive data buffer 18.

The frequency response of the circuit is such that it is an active equivalent of a large inductor. It has a low resistance to DC current (20 to 30 ohms) but its impedance to audio frequency currents is sufficiently high (greater than 20 K ohms) to prevent degradation of the AC impedance of 600 ohms necessary to match the telephone line impedance. Thus, the circuit will pass whatever DC current is available from the phone line (20 milliamperes to 100 milliamperes), but will block any AC currents associated with this audio signal on the line. An inductor to provide such AC blocking while passing such DC currents would be so physically large and/or expensive as to be impractical in this application. This is done by providing the relatively large (1 microfarad) capacitor C17 to stabilize the base-emitter voltages of Q15 and Q16 at the DC line current available. Since C17 can only charge or discharge through R37 (typically 100 K ohms), R38 (typically 470 K ohms), and the high base resistance of Q15, the response to voltage changes is too slow to significantly follow audio signals above 100 Hz.

Initially, when the telephone line is connected, current begins to flow through resistor R37, and capacitor C17 is charged with available voltage within a few milliseconds. The charged capacitor provides a forward bias of the base-emitter junctions of the transistor pair Q15 and Q16, which causes current to flow in the collector-emitter junction of transistor Q16. The base-emitter voltage on the transistor pair reaches its saturation point of about 1.4–1.6 volts and most of the available current from the telephone line is passed through the collector-emitter junction of transistor Q16. This current flows to the shunt regulator and to the load, and any excess current not required by the load is shunted through the shunt regulator. The voltage drop across the line is composed of the 5 volts of the shunt regulator, the voltage across resistor R37, and the base-emitter drops of the transistor pair, and about 1.6 volts drop in the polarity guard, which totals about 7.9 volts at a line current of 20 milliamperes. Rapidly changing voltages on the telephone line will not permit capacitor C17 to change voltage, therefore the collector-emitter current of transistor Q16 remains relatively constant and the AC impedance remains constant at a high level, typically higher than 10 K ohms. The transistors Q15 and Q16 are connected in a modified Darlington configuration providing substantial current gain. This configuration permits the use of a capacitor C17 of small value, typically 1 microfarad, which can also be physically small. Since only a small amount of current need be supplied to the base of transistor Q15, the resistor R37 can be of large value, typically 100 K ohms. The resulting AC impedance across the Darlington pair is therefore high.

The modified Darlington configuration provided by transistors Q15 and Q16 provides the desired current regulation with the minimum voltage drop which will provide the intended constant current characteristics. The transistor Q16 serves as the primary current sink, while transistor Q15 serves as a current buffer between the base of transistor Q16 and the AC coupling circuit composed of resistor R37 a capacitor C17. The collector of transistor Q15 is connected to the reference voltage at the emitter of transistor Q12 which permits the transistor Q15 to maintain an operating voltage of 2-3 volts for efficient current amplifier operation. The resistor R38 between the base and collector of transistor Q15 in conjunction with the resistor R37 biases the voltage at the base of transistor Q15, allowing a decrease in the voltage across transistor Q16. The voltage across transistor Q16 is reduced by about 0.5-1 volt which reduces the total voltage drop across the telephone line to assure that the total voltage drop is below the maximum specified telephone line drop of 8 volts at the minimum line current of 20 milliamperes. The resistors R39 and R40 provide biasing of the respective transistors to limit the buffering characteristics of transistor Q15 and stabilize the AC resistance characteristics of transistor Q16 to minimize harmonic distortion which can interfere with modem performance.

The transistors Q11 and Q12 are also connected in modified Darlington configuration, with these transistors being of complementary PNP and NPN types. The base-emitter voltages of these transistors tend to cancel one another, and as a result the voltage at the base of transistor Q11 tends to remain equal to the voltage at the emitter of transistors Q12. The voltage across the combination of diodes D14 and D15, which is about 2.2 volts, serves as a voltage reference for the emitter of transistor Q12. The light emitting diode (LED) D15 serves as a reference diode having a Zener voltage of about 1.6 volts. This LED (D15) also serves as a front panel lamp to indicate an off hook condition. Additionally, this LED (D15) is part of the current path for the isolator drive 65, which current path also energizes the LED for its indicator function. The values of resistors R32 and R85 are selected to establish the ratio of the regulated 5 volts to the 2.2 volt reference voltage. If the voltage at the base of transistor Q11 is 2.2 volts, equal to the voltage at the emitter of transistor Q12, the total voltage drop across the divider composed of resistors R32 and R85 is 5 volts. This portion of the circuit therefore functions as a shunt regulator operative to provide the regulated operating voltages of 5 volts and 2.2 volts. This constant voltage is maintained for any value of current flow over the operating range.

The front panel indicator D15 flashes when no valid carrier is detected. The flash control signal is provided by the modulator 30 and is typically a 2.5 Hz square wave which is applied via resistor R98 to the bases of transistors Q17 and Q18 which are connected in modified Darlington configuration between Zener diode D14 and the LED D15 and in association with an LED D22 of substantially similar characteristics of those of LED D15. In the absence of a detected carrier, the flash control signal causes the indicator D15 to blink to denote the absence of a detected carrier. The diode D22 serves as the reference diode when the indicator diode D15 is flashing.

If the current changed appreciably, say from 20 to 120 milliamperes, the reference voltage could change appreciably, if all the current were allowed to flow through the reference diodes. This is prevented by an additional current shunt composed of transistor Q10, resistors R31 and R33, and capacitor C14. When the current flow through transistor Q12 reaches a level such that the voltage drop across resistor R33 is sufficient to forward bias transistor Q10, this transistor becomes conductive and shunts any additional current through the shunt path composed of transistor Q10 and resistor R31, rather than allowing the additional current flow through transistor Q12 and the diode pair. Thus for increased currents above a predetermined level, such increased currents are shunted by transistor Q10, and voltage at the emitter of transistor Q12 remains substantially constant.

Electro-optical isolators are employed to isolate the telephone line from the utilization equipment. Two isolators are provided in the transmit data multiplexer 32, one for TTY transmit data and the other for RS232 transmit data. Two isolators are also provided in the receive data buffer 18 for the TTY received data, and RS232 received data, respectively. The isolator circuits are substantially identical and each includes an LED which provides light signals in response to applied electrical signals, and a phototransistor pair providing a corresponding electrical output signal in response to received light signals from the LED. This isolator can be a commercial solid state microcircuit isolator such as an Optron OPI3250. To improve the response time of the isolator at the low current levels available, the isolator can be employed in a circuit such as described in the above-noted copending application, and which provides the necessary improvement in response time to meet the rise and fall time requirements of the modem logic circuitry which are of the order of 10 microseconds. The increased speed is achieved without increase in the low current drive to the isolator LED.

While the invention has been described in exemplary embodiment in a 103 modem, it is contemplated that other modems can be implemented in line-powered form in accordance with the invention. The invention is not to be limited by what has been particularly shown and described, except as indicated in the appended claims.

What is claimed is:

1. A telephone modem comprising:
   a modem transmitter subsystem operative in response to data from a source to provide modulated data signals to the telephone line;
   a modem receiver subsystem operative to provide data signals derived from signals received on the telephone line including a filter selectively providing in response to a mode control signal, a band-pass characteristic in one of two operating frequency bands and selectively providing in response to said mode control signal, a band-rejection characteristic in the other of the two operating frequency bands wherein the selected band-pass characteristic includes a range of frequencies exclusive of the band-rejection characteristic range of frequencies; and
   control means operative to select either of two frequency bands for transmission and reception and for providing the mode control signal,
   wherein said receiver subsystem filter comprises a switchable feedback network band-pass filter providing in response to said mode control signal, a predetermined band-pass characteristic having at least one relative signal amplitude peak in the one of two frequency bands of interest, and a simultaneous band rejected characteristic having at least one relative signal amplitude notch in the other of two frequency bands of interest,
   wherein the filter circuit feedback network includes switch means which alter the feedback network topology to provide the selection of band-pass and band-reject characteristic from among the particular frequency bands of interest.

2. The modem of claim 1 wherein said filter includes a multi-stage active band pass/band reject filter.

3. The modem of claim 2 wherein the switch means includes low power electronic switches operative to provide selection of the intended filter characteristics of each operating band, the switch on resistance having no material effect on the filter characteristics.

4. The modem of claim 3 wherein said switches are CMOS switches.

5. The modem of claim 2 wherein said filter is a stagger tuned active filter.

6. The modem of claim 1 wherein said frequency bands are centered at about 1200 Hz and 2200 Hz respectively.

7. The modem of claim 1 wherein said receiver subsystem includes:
a frequency discriminator operative to provide a digital signal having a duty cycle representing the frequency of the signal from the switchable filter;
a data filter operative to provide an output voltage which is directly proportional to the frequency of the received signal; and
output means operative to provide one of more output signals of predetermined form.

8. The modem of claim 7 wherein said output means includes:
a data buffer operative to provide an output TTY data signal.

9. The modem of claim 8 wherein said output means includes:
an RS232 output interface operative to provide RS232 data signals and a carrier detect signal.

10. The modem of claim 7 wherein said output means includes:
a data buffer operative to provide an output TTY data signal and operative to provide a control signal representative of the mark or space state of the received data;
an RS232 output interface operative in response to the control signal from the data buffer to provide RS232 data signals and a carrier detect signal;
the data buffer including electro-optical isolators for electrically isolating the modem and utilization apparatus;
a carrier detector operative in response to a signal from the frequency discriminator to provide an output signal representative of valid carrier presence or absence; and
DC to DC converter means enabled in response to a signal from the carrier detector representing valid carrier presence and operative to provide the minimum power to the RS232 output interface necessary to ensure that the interface output signals are of sufficient signal level.

11. The modem of claim 10 wherein the DC to DC converter means includes:
means for providing an unbalanced square wave signal;
a transformer having a primary winding and a secondary winding;
electronic switching means coupling the unbalanced square wave signal to the primary winding; and
a rectifier circuit connected to the secondary winding and providing an unbalanced voltage output.

12. The modem of claim 10 wherein said transmitter subsystem includes:
a transmitter operative to provide data to the telephone line for transmission to a receiving site;
a modulator operative to modulate the transmitter carrier; and
timing means including a crystal oscillator and providing clock signals to the transmitter and modulator.

13. The modem of claim 12 wherein said transmitter subsystem includes:
a data buffer having electro-optical isolators by which TTY and RS232 data signals are coupled to the modulator.

14. The modem of claim 1 wherein the total power consumption of said modem circuits is less than 160 milliwatts.

15. The telephone modem of claim 1, further including:
a first circuit for coupling to a telephone line and operative wholly in response to telephone line power to provide operating power for all modem circuits.

16. The telephone modem of claim 1, further including:
means operative in response to the mode control signal to provide a signal to said transmitter subsystem for selection of the intended transmission band, and a signal to said receiver subsystem for selection of an intended reception band.

17. A telephone line powered modem comprising:
a first circuit for coupling to a telephone line and operative wholly in response to telephone line power for all modem circuits;
a modem transmitter subsystem powered by the first circuit and operative in response to data from a source to provide modulated data signals to the telephone line;
a modem receiver subsystem powered by the first circuit and operative to provide data signals derived from signals received on the telephone line, including a switchable band-pass filter providing in response to a mode control signal, a predetermined band-pass characteristic in one and simultaneously a band-reject characteristic exhibits a notch in the other of two respective different operating bands, the selection of which bands are occupied by the band-pass and band-reject characteristics is made by selectable feed-back paths within said switchable band-pass filter; and
control means powered by the first circuit and operative to select either of two operating frequency bands for transmission and reception.

18. For use in a telephone line powered modem which includes a receiver operative to provide data signals derived from signals received on a telephone line, and a transmitter operative in response to data from a source to provide modulated data signals for transmission on the telephone line, a switchable filter operative wholly in response to telephone line power and comprising:
at least one active filter comprising a feedback network which includes solid state low power switch means;
in a first switch mode the filter exhibits a band-pass characteristic in one band of frequencies and a band-reject characteristic in another band of frequencies;
in a second switch mode the filter exhibits the band-pass characteristic in the other band of frequencies and the band-reject characteristic in the one band of frequencies;
wherein the band-reject characteristic exhibits a notch.

* * * * *